US008566505B2

(12) United States Patent
Kilzer et al.

(10) Patent No.: US 8,566,505 B2
(45) Date of Patent: *Oct. 22, 2013

(54) FLASH MANAGEMENT USING SEQUENTIAL TECHNIQUES

(75) Inventors: Kevin L. Kilzer, Chandler, AZ (US);
Robert W. Ellis, Phoenix, AZ (US);
Rudolph J. Sterbenz, Chandler, AZ (US)

(73) Assignee: SMART Storage Systems, Inc., Chandler, AZ (US)

( * ) Notice: Subject to any disclaimer, the term of this patent is extended or adjusted under 35 U.S.C. 154(b) by 920 days.

This patent is subject to a terminal disclaimer.

(21) Appl. No.: 12/103,273

(22) Filed: Apr. 15, 2008

(65) Prior Publication Data

US 2009/0259800 A1    Oct. 15, 2009

(51) Int. Cl.
*G06F 12/00* (2006.01)
*G06F 13/00* (2006.01)

(52) U.S. Cl.
USPC .................... 711/103; 711/100; 711/154

(58) Field of Classification Search
USPC ..................... 711/103, 100, 154
See application file for complete search history.

(56) References Cited

U.S. PATENT DOCUMENTS

| 5,930,504 | A | 7/1999 | Gabel |
| 5,963,983 | A | 10/1999 | Sakakura et al. |
| 6,412,080 | B1 | 6/2002 | Fleming et al. |
| 7,107,389 | B2 | 9/2006 | Inagaki et al. |
| 7,139,864 | B2 | 11/2006 | Bennett et al. |
| 7,330,927 | B1 | 2/2008 | Reeve et al. |
| 2003/0163633 | A1 | 8/2003 | Aasheim et al. |
| 2005/0021904 | A1 | 1/2005 | Iaculo et al. |
| 2005/0038792 | A1 | 2/2005 | Johnson |
| 2005/0273551 | A1* | 12/2005 | Keays ............................ 711/103 |
| 2006/0020745 | A1 | 1/2006 | Conley et al. |
| 2006/0069852 | A1* | 3/2006 | Aasheim et al. .............. 711/103 |
| 2006/0101219 | A1 | 5/2006 | Mita et al. |
| 2006/0106749 | A1 | 5/2006 | Ganfield et al. |
| 2006/0136682 | A1 | 6/2006 | Haridas et al. |
| 2006/0143365 | A1 | 6/2006 | Kikuchi |
| 2006/0224823 | A1 | 10/2006 | Morley et al. |
| 2006/0256624 | A1 | 11/2006 | Eggleston et al. |
| 2006/0282644 | A1 | 12/2006 | Wong |
| 2007/0005928 | A1* | 1/2007 | Trika et al. ..................... 711/202 |
| 2007/0033374 | A1* | 2/2007 | Sinclair et al. ................. 711/203 |
| 2007/0198796 | A1 | 8/2007 | Warren, Jr. |
| 2007/0234004 | A1 | 10/2007 | Oshima et al. |
| 2007/0276973 | A1 | 11/2007 | Tan et al. |
| 2007/0283428 | A1* | 12/2007 | Ma et al. ........................... 726/9 |
| 2008/0046630 | A1 | 2/2008 | Lasser |
| 2008/0077762 | A1 | 3/2008 | Scott et al. |
| 2008/0133832 | A1 | 6/2008 | Bhavnani |
| 2008/0195822 | A1 | 8/2008 | Yang et al. |

(Continued)

OTHER PUBLICATIONS

IPRP dated Sep. 14, 2010 for International Application No. PCT/US2009/040713.

(Continued)

*Primary Examiner* — Tuan V. Thai (74) *Attorney, Agent, or Firm* — Ishimaru & Associates LLP (57) ABSTRACT

Disclosed are techniques for flash memory management, including receiving data from a host, writing the data to a flash memory device in the order it was received from the host, and providing at least one data structure configured to locate the data written to the flash memory device.

20 Claims, 8 Drawing Sheets

(56) References Cited

U.S. PATENT DOCUMENTS

2009/0164702 A1* 6/2009 Kern .......................... 711/103
2010/0077136 A1 3/2010 Ware et al.
2010/0241798 A1* 9/2010 Wong .......................... 711/103

OTHER PUBLICATIONS

IPRP dated Sep. 14, 2010 for International Application No. PCT/US2009/040714.
IPRP dated Sep. 14, 2010 for International Application No. PCT/US2009/040715.
ISR and WO dated Nov. 26, 2009 for International Application No. PCT/US2009/040713.
ISR and WO dated Dec. 1, 2009 for International Application No. PCT/US2009/040714.
ISR and WO dated Dec. 1, 2009 for International Application No. PCT/US2009/040715.
Office Action dated Nov. 10, 2010 for U.S. Appl. No. 12/103,277.
Final Office Action dated May 10, 2011 for U.S. Appl. No. 12/103,277, 17 pages.
Non Final Office Action dated May 26, 2011 for U.S. Appl. No. 12/424,466, 18 pages.

* cited by examiner

FLASH MANAGEMENT USING SEQUENTIAL TECHNIQUES

TECHNICAL FIELD

The present disclosure relates to information storage, particularly storage in flash memory systems and devices.

BACKGROUND

Flash memory is a storage medium which may be erased and written electronically. It is non-volatile, and therefore maintains the information contained within it without the need for power. It typically offers improved resistance to kinetic damage compared to other storage technologies, such as magnetic disks and tapes. However, the number of write and/or erase cycles which may be performed on any particular block of flash memory is finite. Because a flash memory device holds many individual memory blocks, write and/or erase cycles are often distributed across the entire memory array in order to extend the functional lifetime of each memory block.

Techniques for distributing write and/or erase cycles across a flash memory array are commonly known as wear leveling. Nevertheless, despite the existence of various such wear leveling techniques, it remains desirable to further improve the performance of flash memory in order to realize benefits such as improved read speeds, improved write speeds, and increased flash memory functional lifetime.

SUMMARY

This disclosure relates to flash memory management using sequential techniques. In one exemplary embodiment, flash memory may be managed, such as by receiving data from a host, writing the data in the order it was received to an erase block in a flash memory device, and providing a data structure to locate the data.

In another exemplary embodiment, a solid state drive is provided. A flash controller is configured to communicate with a host, and a flash chip is configured to receive data from the flash controller. The flash controller is configured to write incoming data in a manner which preserves time order of the data.

In another exemplary embodiment, a data storage system comprises a memory configured for block-based erase operations and a controller coupled to the memory. The controller is configured to write incoming data to the memory in the order the data is received.

The contents of this summary section are provided only as a simplified introduction to the disclosure, and are not intended to be used to interpret or limit the scope of the appended claims.

BRIEF DESCRIPTION OF THE DRAWINGS

With reference to the following description, appended claims, and accompanying drawings:

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for flash management may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical flash memory management system.

For purposes of convenience, the following definitions may be used in this disclosure:

A page is a logical unit of flash memory.

An erase block is a logical unit of flash memory containing multiple pages.

Payload data is data stored and/or retrieved by a host, such as a host computer or other external data source.

Wear leveling is a process by which locations in flash memory are utilized such that the entire flash memory ages substantially uniformly, reducing localized overuse and associated failure of individual, isolated locations.

Metadata is data related to a portion of payload data (such as one page), which may provide identification information, support information, or other information to assist in managing payload data, such as to assist in determining the position of payload data within the storage context as understood by a host computer.

Prior flash memory management schemes often assume that pages within an erase block can be written in any order, and so allow payload data to be deposited non-sequentially. This simplifies the task of locating a specific block for retrieval by placing the blocks into a predefined order that allows addresses to be calculated using numerical methods instead of tabular methods, and has no bearing on the order in which blocks arrive from the host. These prior flash memory management schemes would sometimes additionally implement wear leveling techniques in order to increase the lifetime of a flash memory device. However, such flash memory management schemes often perform poorly when writing data that is substantially unsorted, fragmented, or otherwise disjoint ("random writes"). In these schemes, random write performance may be as much as two orders of magnitude slower than performance when writing substantially sorted, related, or contiguous data ("sequential writes"). In transaction-based computing systems and other high-load applications, data often comprises highly fragmented and/or random portions, rather than large, contiguous portions. As such, prior flash memory management schemes offer unsuitable performance for use in these areas, because the vast majority of write operations are random writes.

In contrast, in accordance with an exemplary aspect of the present invention, flash memory management is improved by writing payload data to a particular flash memory device in the order in which it was received, and/or in sequential order within an erase block. Thus, in essence, sequences of random data are written in the same manner as sequences of contiguous data. Such an approach can vastly improve random write performance, with minimal impact on sequential write performance. A flash memory device, such as a solid state drive, configured to achieve improved random write performance can better suit the needs of, for example, applications in the small block size enterprise storage market, such as database and database-like programs, and other applications which make frequent, small accesses to data storage.

By writing incoming payload data in the order in which it was received, the time order of the incoming payload data is preserved. Further, such an approach can eliminate position dependence of payload data within an erase block. Stated another way, because incoming payload data is written in the order it was received, there may be no ordinal relationship among pages of payload data stored within an erase block. In particular, payload data stored within an erase block may be entirely disjoint, with each page of payload data having no relationship to any other page of payload data.

Further, certain modern flash memory devices (for example, Intel SD58 series NAND flash memory) impose the restriction that pages within an erase block must be written in sequential order. However, prior flash memory management systems comprising these flash memory devices did not write incoming data directly to the flash memory device in the order in which it was received. Rather, these prior systems may have held incoming data in a buffer until a full erase block of related data was received, and then wrote the entire erase block of related data to the flash memory device at once (i.e. these prior systems wrote sequences of contiguous data differently than sequences of random data). When operating within the constraints presented by such devices, and in accordance with an exemplary aspect of the present invention, a flash memory management system realizes improvements in data integrity by writing sequences of random data in the same manner as sequences of contiguous data. However, the principles of the present invention may be applied to all flash memory, and are not limited to flash memory which imposes the restriction that pages within an erase block must be written in sequential order. Additionally, the principles of the present invention may be applied to any storage technology which requires data to be erased on a blockwise basis.

With reference to FIG. 1, FIG. 2, FIG. 3A, FIG. 3B, and FIG. 4, in accordance with an exemplary embodiment, a flash memory management system comprises a solid state drive 102. Solid state drive 102 may be coupled to a host computer 108. Solid state drive 102 comprises a flash chip array 110 and a flash chip controller 104. Flash chips 106 in flash chip array 110 are divided into erase blocks 312, and erase blocks 312 are divided into pages 314. One or more data structures, such as data tables 408, to support solid state drive 102 are constructed in RAM 402 of sequence and control machine 210.

Returning now to FIG. 1, in accordance with an exemplary embodiment, a solid state drive 102 is a storage medium capable of storing electronic information in a persistent form, typically in computer chips or other solid-state devices. In an exemplary embodiment, solid state drive 102 comprises a thumb drive. In other exemplary embodiments, solid state drive 102 comprises a storage medium in a desktop computer, a laptop computer, a smartphone, or a personal digital assistant. Solid state drive 102 can be used in place of magnetic disk drives or certain other magnetic, optical, or electronic storage components in computing systems. Solid state drive 102 can provide significant advantages when compared to magnetic or optical storage, such as faster seek times, faster access times, improved ruggedness and reliability, lower operating noise, and lower power consumption. Depending on the configuration and components of a particular solid state drive 102, it may be compatible with computer storage interface protocols, including but not limited to Serial Advanced Technology Attachment (SATA), Parallel Advanced Technology Attachment (PATA), Small Computer System Interface (SCSI), IEEE 1394 (Firewire), Serial Attached SCSI (SAS), and Universal Serial Bus (USB). Further, solid state drive 102 may be configured to conform with standard storage form factors, such as "5.25 inch", "3.5 inch" (commonly used in desktop storage products), and "2.5 inch" (commonly used in mobile computing products).

Figure 1:
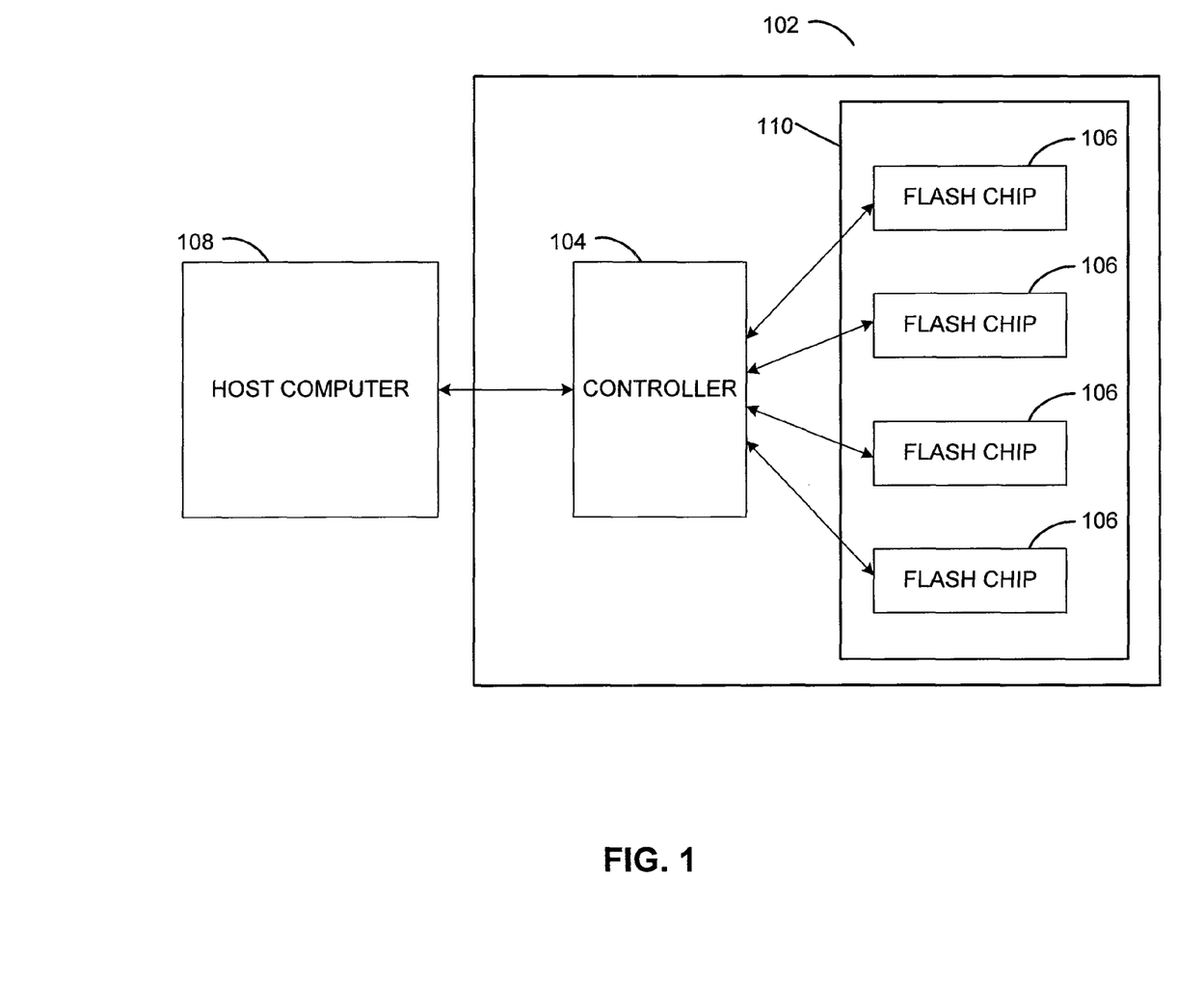
FIG. 1 represents a solid state drive and host computer system in accordance with an exemplary embodiment of the invention.

A flash chip array, such as flash chip array 110, comprises one or more flash chips 106. Any number of flash chips may be selected. In one exemplary embodiment, a flash chip array 110 comprises sixteen flash chips. In various exemplary embodiments, other suitable numbers of flash chips 106 may be selected, such as one, two, four, eight, or thirty-two flash chips. Flash chips 106 may be selected to meet storage size, power draw, or other desired flash chip array characteristics.

Figure 3A:
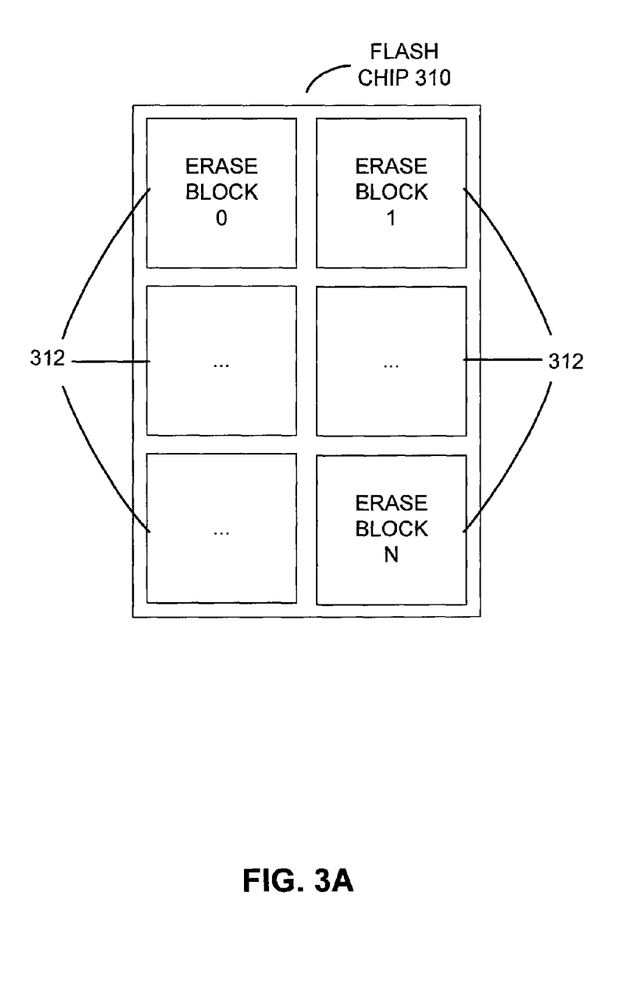
FIG. 3A represents a flash chip containing erase blocks in accordance with an exemplary embodiment of the invention.

In an exemplary embodiment, flash chip array 110 comprises flash chips 106 having similar storage sizes. In various other exemplary embodiments, flash chip array 110 comprises flash chips 106 having different storage sizes. Any number of flash chips 106 having various storage sizes may be selected. Further, a number of flash chips 106 having a significant number of unusable erase blocks 312 may comprise flash chip array 110. In this manner, one or more flash chips 106 which may have been unsuitable for use in a particular solid state drive 102 can now be utilized. For example, a particular flash chip 106 may contain 2 gigabytes of storage capacity. However, due to manufacturing processes or other factors, 1 gigabyte of the storage capacity on this particular flash chip 106 may be unreliable or otherwise unusable. Similarly, another flash chip 106 may contain 4 gigabytes of storage capacity, of which 512 megabytes are unusable. These two flash chips 106 may be included in a flash chip array 110, and the total storage capacity of flash chip array 110 may be reported as 4 gigabytes.

Thus, in an exemplary embodiment, the reported storage capacity of flash chip array 110 may be smaller than the actual storage capacity, for such reasons as to compensate for the development of bad blocks, provide space for defragmentation operations, provide space for index information, extend the useable lifetime of flash chip array 110, and the like. For example, flash chip array 110 may comprise flash chips 106 having a total useable storage capacity of 10 gigabytes. However, the reported capacity of flash chip array 110 may be 2 gigabytes. Thus, individual memory elements in flash chip array 110 may be utilized in a reduced manner, and the useable lifetime of flash chip array 110 may be extended. In the present example, the useable lifetime of flash chip array 110 would be about five times longer than the useable lifetime of a flash chip array 110 containing only 2 gigabytes of total useable storage capacity.

Flash chips 106 may be mounted on a printed circuit board. Flash chips 106 may also be mounted in other suitable configurations in order to facilitate their use in forming flash chip array 110.

In an exemplary embodiment, flash chip array 110 is configured to interface with flash controller 104. Flash controller 104 is configured to facilitate reading, writing, erasing, and other operations on flash chips 106. Flash controller 104 may be configured in any suitable manner to facilitate operations on flash chips 106 in flash chip array 110.

In flash chip array 110, and according to an exemplary embodiment, individual flash chips 106 are configured to receive a chip select (CS) signal. A CS signal is configured to locate, address, and/or activate a flash chip 106. For example, in a flash chip array 110 with eight flash chips 106, a three-bit binary CS signal would be sufficient to uniquely identify each individual flash chip 106. In an exemplary embodiment, CS signals are sent to flash chips 106 from flash controller 104. In another exemplary embodiment, discrete CS signals are decoded within flash controller 104 from a three-bit CS value and applied individually to each of the flash chips 106.

In an exemplary embodiment, multiple flash chips 106 in flash chip array 110 may be accessed simultaneously. Simultaneous access can facilitate performance gains, such as improvements in responsiveness and throughput of flash chip array 110.

A flash chip, such as flash chip 106, may be an integrated circuit fabricated on a single piece of silicon or other suitable substrate. Alternatively, flash chip 106 may comprise integrated circuits fabricated on multiple substrates. One or more flash chips 106 may be packaged together in a standard package such as a thin small outline package, ball grid array, stacked package, land grid array, quad flat package, or other suitable package, such as standard packages approved by the Joint Electron Device Engineering Council (JEDEC). A flash chip 106 may also conform to specifications promulgated by the Open NAND Flash Interface Working Group (OFNI). A flash chip 106 can be fabricated and packaged in any suitable manner for inclusion in a flash chip array 110.

Flash chip 106 may contain any number of non-volatile memory elements, such as NAND flash elements, NOR flash elements, and the like. Flash chip 106 may also contain control circuitry. Control circuitry can facilitate reading, writing, erasing, and other operations on non-volatile memory elements. Such control circuitry may comprise elements such as microprocessors, registers, buffers, counters, timers, error correction circuitry, and input/output circuitry. Such control circuitry may also be located external to flash chip 106.

Figure 3B:
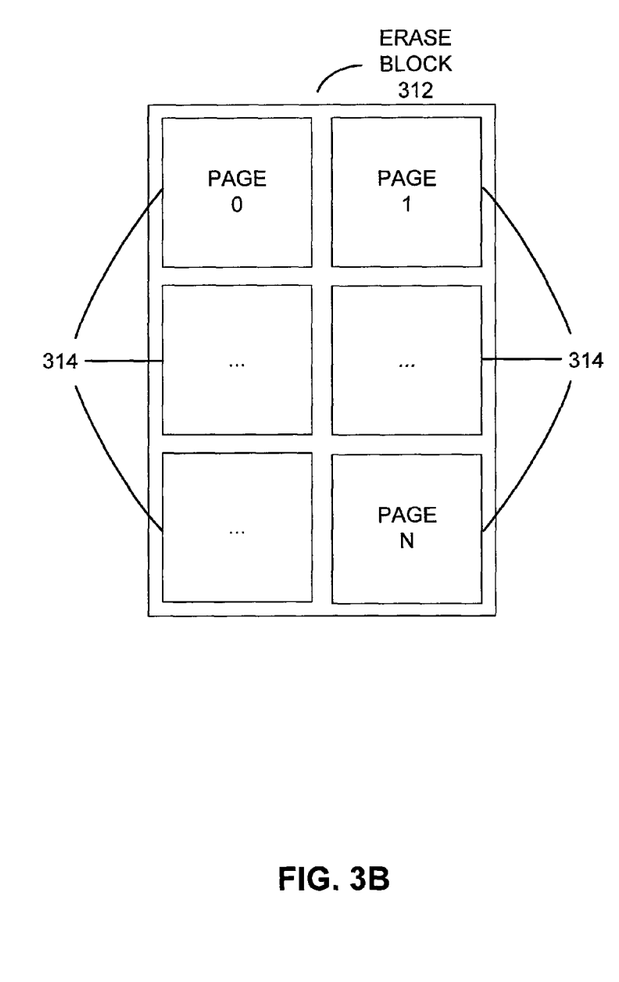
FIG. 3B represents an erase block containing pages in accordance with an exemplary embodiment of the invention.

In an exemplary embodiment, non-volatile memory elements on flash chip 106 are configured as a number of erase blocks 0 to N. With reference to FIG. 3A and FIG. 3B, a flash chip 106, such as flash chip 310, comprises one or more erase blocks 312. Each erase block 312 comprises one or more pages 314. Each page 314 comprises a subset of the non-volatile memory elements within an erase block 312. Each erase block 312 contains about 1/N of the non-volatile memory elements located on flash chip 310.

In general, because flash memory, particularly NAND flash memory, may often be erased only in certain discrete sizes at a time, flash chip 310 typically contains a large number of erase blocks 312. Such an approach allows operations on a particular erase block 312, such as erase operations, to be conducted without disturbing data located in other erase blocks 312. Alternatively, were flash chip 310 to contain only a small number of erase blocks 312, data to be erased and data to be preserved would be more likely to be located within the same erase block 312. In the extreme example where flash chip 310 contains only a single erase block 312, any erase operation on any data contained in flash chip 310 would require erasing the entire flash chip 310. If any data on flash chip 310 was desired to be preserved, that data would need to be read out before the erase operation, stored in a temporary location, and then re-written to flash chip 310. Such an approach has significant overhead, and could lead to premature failure of the flash memory due to excessive, unnecessary read/write cycles.

With continued reference to FIG. 3A and FIG. 3B, an erase block 312 comprises a subset of the non-volatile memory elements located on flash chip 310. Although memory elements within erase block 312 may be programmed and read in smaller groups, all memory elements within erase block 312 may only be erased together. Each erase block 312 is further subdivided into any suitable number of pages 314. A flash chip array 110 may be configured to comprise flash chips 310 containing any suitable number of pages 314.

A page 314 comprises a subset of the non-volatile memory elements located within an erase block 312. In an exemplary embodiment, there are 64 pages 314 per erase block 312. To form flash chip array 110, flash chips 106 comprising any suitable number of pages 314 per erase block 312 may be selected.

In addition to memory elements used to store payload data, a page 314 may have memory elements configured to store error detection information, error correction information, and/or other information intended to ensure safe and reliable storage of payload data. In an exemplary embodiment, metadata stored in a page 314 is protected by error correction codes. In various exemplary embodiments, a portion of erase block 312 is protected by error correction codes. This portion may be smaller than, equal to, or larger than one page.

In an exemplary embodiment, erase block 312 comprises 64 pages 314. Of these pages, 63 are configured to store payload data, such as data received from an external source, such as host computer 108. The final page is configured to contain erase block index information. Furthermore, any number of pages in erase block 312 may be used to store payload data and/or erase block index information. In an exemplary embodiment, erase block index information stored in the final page comprises a duplicate copy of metadata associated with each page 314 configured to store payload data. Additionally, index information for a particular erase block 312 may be stored in the final page of a different erase block 312. For example, index information for a particular erase block 312 located on a flash chip 106 may be stored in an erase block 312 located on a different flash chip 106. Erase block index information may be stored in any suitable location configured to store index information. Multiple copies of erase block index information for a particular erase block 312 may be stored at various locations in flash chip array 110.

Figure 4:
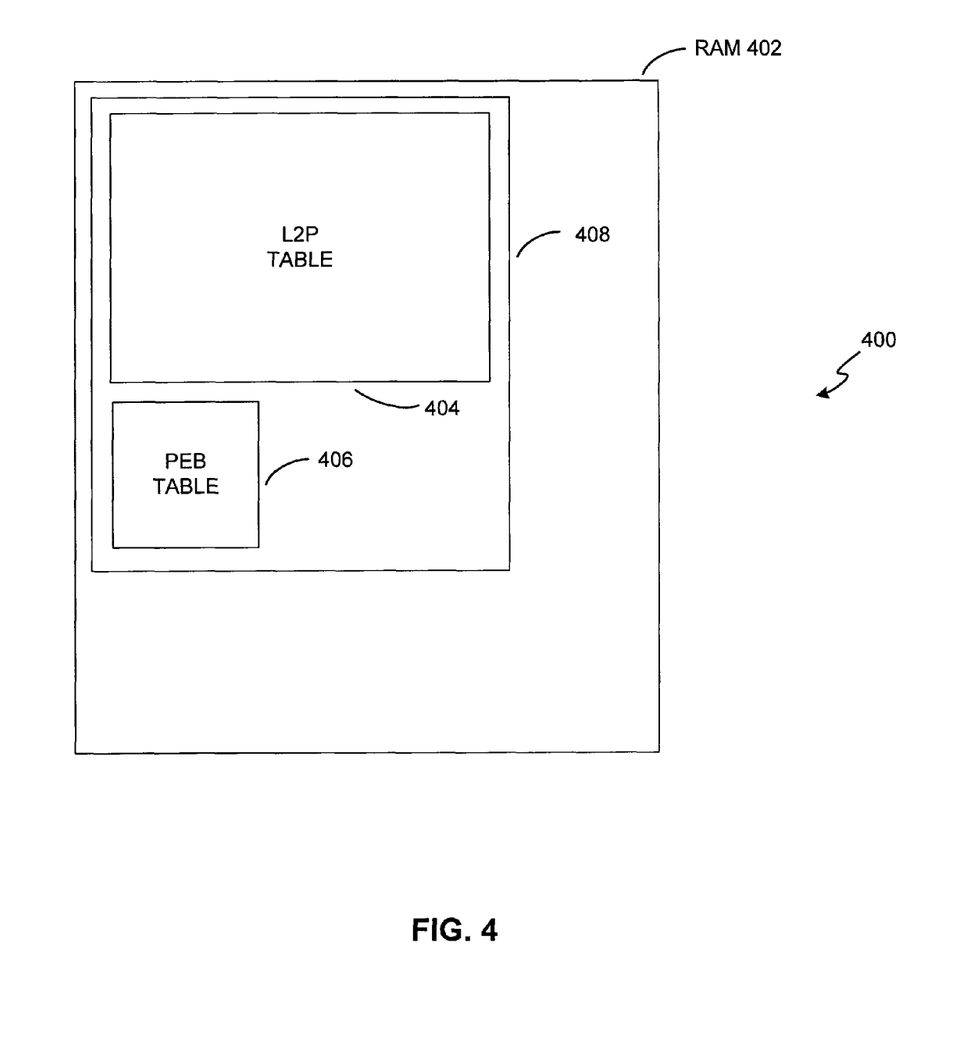
FIG. 4 illustrates data structures in accordance with an exemplary embodiment of the invention.

With reference to FIG. 4 and in an exemplary embodiment, index information is used to construct or reconstruct one or more data structures. For example, an erase block table, such as a physical erase block (PEB) table 406, and/or a page table, such as a logical to physical (L2P) table 404, can be created in RAM 402 in sequence and control machine 210. Index information for an erase block 312 may be constructed, stored, or otherwise held in RAM 402 in sequence and control machine 210. In accordance with an exemplary embodiment, index information for an erase block 312 is written to final page 314 when all other pages 314 within erase block 312 have been filled with payload data. Index information for an erase block 312 may also be written to final page 314 when a write operation to erase block 312 is completed, even though all other pages within erase block 314 may not yet be filled with payload data. Index information for an erase block 312 may be written to final page 314 at any time in order to provide an accurate record of the contents and status of erase block 312.

When an erase block 312 contains no valid payload data, it is ready to be erased. The index information for this erase block 312 may be marked as obsolete. An erase block 312 may be erased at any appropriate time.

Figure 2:
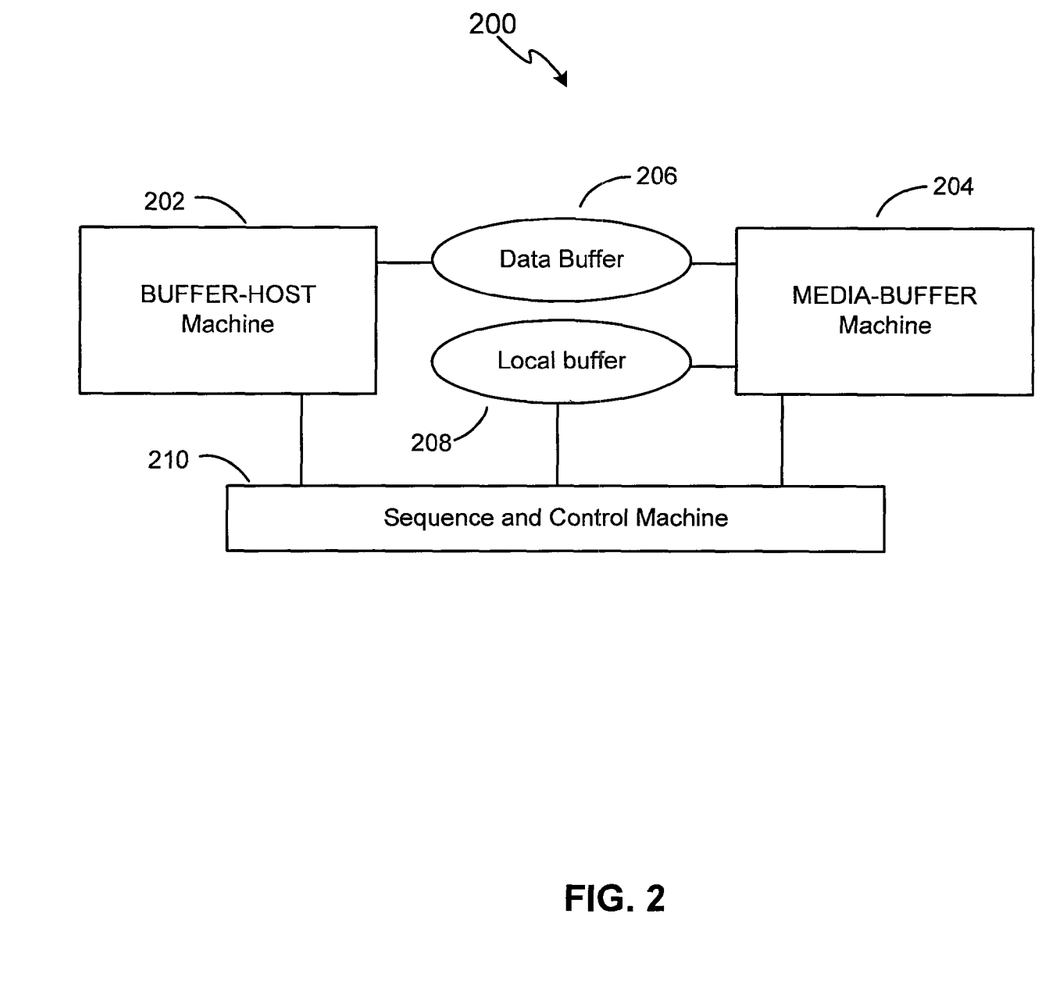
FIG. 2 discloses a flash controller in accordance with an exemplary embodiment of the invention.

Turning now to FIG. 2, a flash controller 104, such as flash controller 200, may comprise any suitable circuitry configured to interface with flash chips 106 and with host computer 108. For example, flash controller 200 may be implemented on a field programmable gate array (FPGA). In another example, flash controller 200 may be implemented on an application specific integrated circuit (ASIC). Further, flash controller 200 may be implemented on any suitable hardware. In accordance with an exemplary embodiment, flash controller 200 comprises a buffer-host machine 202, a media-buffer machine 204, a data buffer 206, a local buffer 208, and a sequence and control machine 210. Flash controller 200 is configured to communicate with host computer 108 and with flash chips 106.

Buffer-host machine 202 may comprise any suitable circuitry configured to provide an interface between data buffer 206 and an external data source, such as host computer 108. In an exemplary embodiment, buffer-host machine 202 is configured to interface with host computer 108. Buffer-host machine 202 is further configured to control the flow of payload data between host computer 108 and data buffer 206. Buffer-host machine 202 is configured to receive and optionally queue commands from host computer 108. Any errors resulting from these commands are returned to host computer 108 on behalf of sequence and control machine 210. In particular, commands that do not involve the transfer of payload data are not applied to sequence and control machine 210, but instead are handled directly by buffer-host machine 202.

In an exemplary embodiment, for a solid state drive 102 configured as an ATA drive replacement, such non-payload commands comprise ATA commands, such as the ATA IDENTIFY and ATA SET FEATURES commands. In an exemplary embodiment, buffer-host machine 202 is configured to have logical block address level visibility into data buffer 206. Such a configuration allows buffer-host machine 202 to reduce latency. Further, it allows buffer-host machine 202 to manage data transfers which are less than one page in size.

Data buffer 206 may comprise any suitable circuitry configured to connect media-buffer machine 204 and buffer-host machine 202. In an exemplary embodiment, data buffer 206 is a page-sized buffer. In other embodiments, data buffer 206 may be larger than one page. Data buffer 206 may be any size suitable to be configured to connect media-buffer machine 204 and buffer-host machine 202. In an exemplary embodiment, data buffer 206 is configured to hold data as a short-time cache (for example, for less-than-page sized operations). In various exemplary embodiments, data buffer 206 is configured as a first-in-first-out (FIFO) buffer. In other exemplary embodiments, data buffer 206 is configured in any suitable manner to connect media-buffer machine 204 and buffer-host machine 202. Further, data buffer 206 may be configured to transfer data between host-buffer machine 202 and media-buffer machine 204.

Media-buffer machine 204 may comprise any suitable circuitry configured to provide an interface between data buffer 206 and flash chip array 110. In an exemplary embodiment, media-buffer machine 204 is configured to communicate with and control one or more flash chips 106. In various exemplary embodiments, media-buffer machine 204 is configured to provide error correction code generation and checking capabilities.

Local buffer 208 is a buffer configured to capture local data. In an exemplary embodiment, local buffer 208 can capture error correction data.

Sequence and control machine 210 may comprise any suitable circuitry configured to receive payload data processing commands from buffer-host machine 202, and configured to implement the logic and computational processes necessary to carry out and respond to these commands. In an exemplary embodiment, sequence and control machine 210 is configured to create, access, and otherwise manage data structures, such as data tables 408. Further, sequence and control machine 210 is configured to coordinate buffer-host machine 202, data buffer 206, local buffer 208, and media-buffer machine 204 in order to implement tasks such as read, write, and garbage collection (as illustrated in exemplary embodiments in FIGS. 5, 6, 7 and 8).

Turning again to FIG. 4, in accordance with an exemplary embodiment, one or more data structures, such as data tables 408, are maintained in random access memory (RAM) of sequence and control machine 210, such as RAM 402. Data tables 408 are configured to facilitate read, write, erase, and other operations on flash chip array 110 in solid state drive 102.

According to an exemplary embodiment, data tables 408 are stored in their entirety in RAM 402 of sequence and control machine 210. No portion of data tables 408 is stored on a hard disk drive, solid state drive, magnetic tape, or other non-volatile medium. Prior approaches were unable to store data tables 408 in their entirety in RAM 402 due to the limited availability of space in RAM 402. But now, large amounts of RAM 402, such as 1 gigabyte, 4 gigabytes, or more, are relatively inexpensive and are now commonly available for use in sequence and control machine 210. Because data tables 408 are stored in their entirety in RAM 402, which may be quickly accessed, system speed can be increased when compared to former approaches which stored only a portion of a data table in RAM 402, and stored the remainder of a data table on a slower, nonvolatile medium. In other exemplary embodiments, portions of data tables 408, such as infrequently accessed portions, are strategically stored in non-volatile memory. Such an approach balances the performance improvements realized by keeping data tables 408 in RAM 402 with the potential need to free up portions of RAM 402 for other uses.

With continued reference to FIG. 4, in an exemplary embodiment, a logical page is mapped to a particular area of physical non-volatile memory on a flash chip 106 by use of a table, such as a logical to physical (L2P) table 404. Entries in L2P table 404 contain physical addresses for logical memory pages. Entries in L2P table 404 may also contain additional information about the page in question. The size of L2P table 404 defines the apparent capacity of solid state drive 102.

L2P table 404 contains information configured to map a logical page to a logical erase block and page. For example, in an exemplary embodiment, in L2P table 404 an entry contains 22 bits: an erase block number (16 bits), and a page offset number (6 bits). With reference to FIG. 3A and FIG. 3B, the erase block number identifies a specific logical erase block 312 in solid state drive 102, and the page offset number identifies a specific page 314 within erase block 312. The number of bits used for the erase block number, and the page offset number may be increased or decreased depending on the number of flash chips 106, erase blocks 312, and/or pages 314 desired to be indexed.

With continued reference to FIG. 3A, FIG. 3B, and FIG. 4, erase blocks 312 in a solid state drive 102 may be managed via a table, such as a physical erase block (PEB) table 406. PEB table 406 may be configured to contain any suitable information about erase blocks 312. In an exemplary embodiment, PEB table 406 contains information configured to locate erase blocks 312 in flash chip array 110.

In an exemplary embodiment, PEB table 406 is located in its entirety in RAM 402 of sequence and control machine 210. Further, PEB table 406 is configured to store information about each erase block 312 in flash chip array 110, such as the flash chip 106 where erase block 312 is located (i.e. a chip select (CS) value), the location of erase block 312 on flash chip 106, the state (e.g. dirty, erased, and the like) of pages 314 in erase block 312, the number of pages 314 in erase block 312 which currently hold payload data, the next page 314 within erase block 312 available for writing incoming payload data, information regarding the wear status of erase block 312, and the like. Additionally, the size of PEB table 406 may be varied in order to allow tracking and management of operations on portions of erase block 312 smaller than one page in size. Further, pages 314 within erase block 312 may be tracked, such that when a particular page is deemed unusable, the remaining pages in erase block 312 may still be used, rather than marking the entire erase block 312 containing the unusable page as unusable.

In addition to L2P table 404 and PEB table 406, other data structures, such as data tables 408, may be configured to manage the contents of flash chip array 110. In an exemplary embodiment, L2P table 404, PEB table 406, and all other data tables 408 are located in their entirety in RAM 402 of sequence and control machine 210. In other exemplary embodiments, L2P table 404, PEB table 406, and all other data tables 408 are located in any suitable location configured for storing data structures.

In an exemplary embodiment, data structures, such as data tables 408, are constructed using erase block index information stored in the final page of each erase block 312. Data tables 408 are constructed when solid state drive 102 is powered on. In another exemplary embodiment, data tables 408 are constructed using the metadata associated with each page 314 in flash chip array 110. Again, data tables 408 are constructed when solid state drive 102 is powered on. Data tables 408 may be constructed, updated, modified, and/or revised at any appropriate time to enable operation of solid state drive 102.

Figure 5:
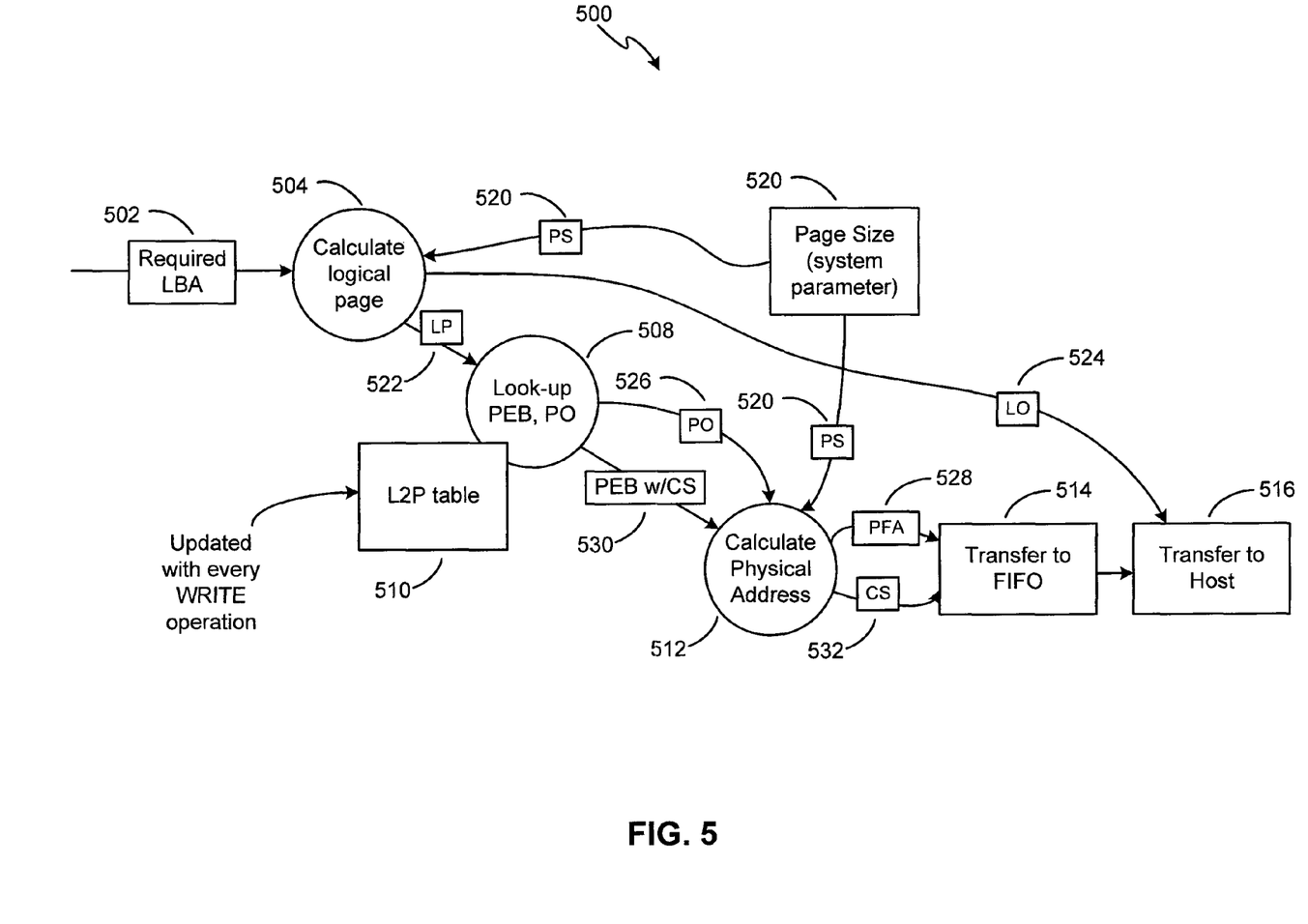
FIG. 5 shows a flowchart for a read operation in accordance with an exemplary embodiment of the invention.

Turning now to FIG. 5, in an exemplary embodiment, the contents of a desired logical page 314 may be retrieved from solid state drive 102 and delivered to host computer 108.

In this exemplary embodiment, the required logical block address (LBA) 502 of a desired logical page 314 is used together with the page size (PS) 520 to calculate a logical page number (LP) 522. LP 522 is determined by dividing LBA 502 by PS 520. The LBA offset (LO) 524 is a value equal to LBA 502 mod PS 520. Once the logical page number 522 has been obtained, the entry in the L2P table 510 corresponding to L2P[LP] is retrieved. If valid, the entry is divided into portions identifying the physical erase block (PEB) and chip select (CS) portion 530, and the page offset (PO) portion 526. In contrast, if the corresponding table entry in L2P table 404 shows that this is an invalid address, the read operation will return blank data to host computer 108. Further, if the corresponding table entry in L2P table 404 does not have an entry for LP 522 (i.e. an out of bounds request), an appropriate error response is returned to host computer 108.

In an exemplary embodiment, once the physical address of target page 314 is obtained, the data held in target page 314 is retrieved from target page 314, transferred to local buffer 514, and returned to host computer 108. As the data passes through sequence and control machine 210, error correction codes are calculated, and any necessary corrections are made to the data. Media-buffer machine 204 may use advanced features of flash chips 106 to accelerate the data transfer. For example, Intel SD58 series flash chips feature both multiplane and cached operations. These features can reduce the time required for retrieval of more than one page from flash chips 106 compared to retrieving more than one page using the baseline command option.

Figure 6:
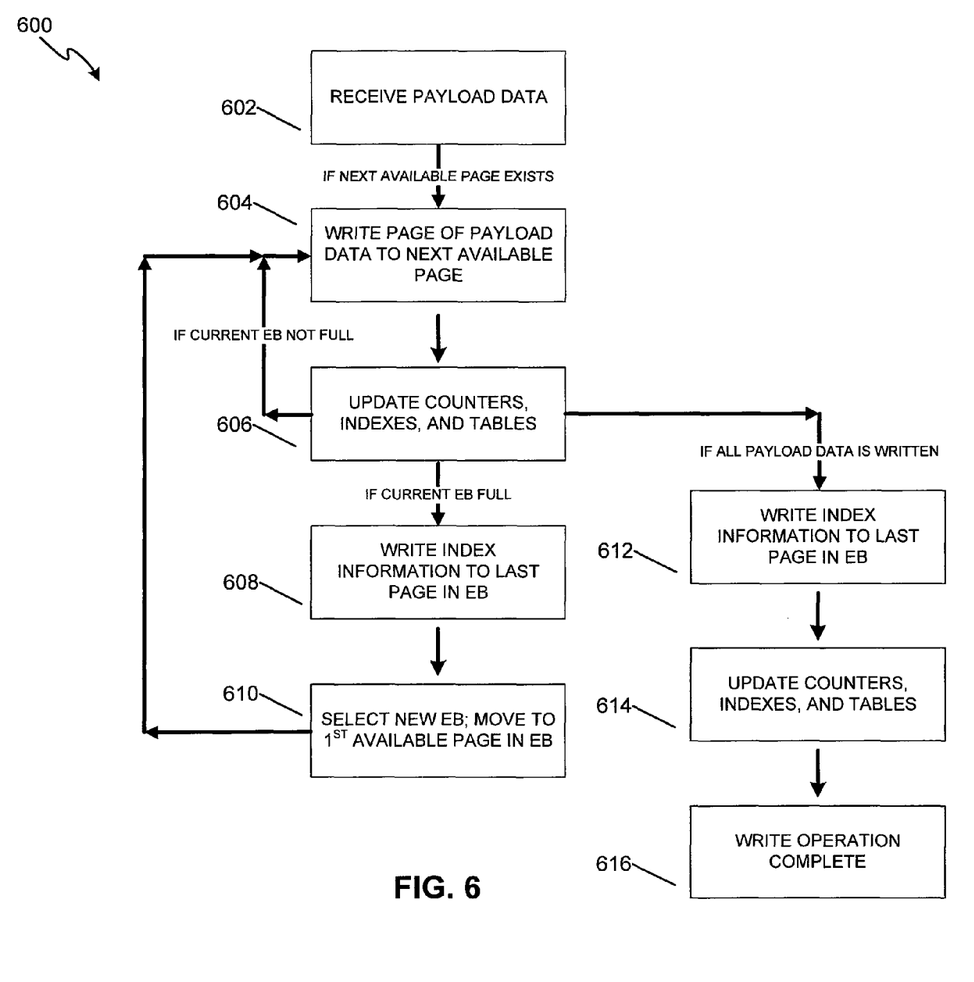
FIG. 6 shows a flowchart for a sequential write operation in accordance with an exemplary embodiment of the invention.

Certain flash chips 106 impose the restriction that pages 314 within an erase block 312 must be written in sequential order. Turning now to FIG. 6, in an exemplary embodiment, in sequential writing method 600, payload data is written to the current target page 314, which is located at the current erase block 312 and current page offset.

In an exemplary embodiment, payload data is received from host computer 108 (step 302). If a current target page 314 does not exist, data is held in a buffer until a current target page 314 becomes available. A current target page 314 may not be available if defragmentation or garbage collection operations are in process, in which case the transfer of payload data from host computer 108 is postponed until the defragmentation or garbage collection process is complete or paused. Once a current target page 314 is located, payload data is combined with metadata, such as logical page information and timestamp, and written to the current target page 314 in the current erase block 312 in a flash chip 106 (step 604). All necessary recordkeeping tasks are then performed (step 606). In an exemplary embodiment, the current erase block 312 and page offset information are written to L2P[LP]. Two entries in PEB table 406 are updated. The entry for the new erase block 312 (the one just recorded in L2P table 404) is incremented to show that a new page 314 has been written. The entry for the original erase block 312 (the one originally found in L2P table 404) is decremented to show that a page 314 is now obsolete. At this point, if all pages 314 in the current erase block 312 are not yet filled with payload data, and payload data remains to be written, the next page of payload data is written to the current target page 314. Further, if the original erase block 312 now contains only obsolete pages, this erase block 314 is scheduled to be erased.

Additionally, if page offset information now indicates that all pages 314 in current erase block 312 except index page 314 are full, index information for current erase block 312 is written to index page 314 (step 608). The current erase block is marked as full. Then, a new erase block 312 is selected as the current erase block 312 (step 610). The first empty page 314 in the new erase block 312 becomes the current target page 314. Writing then continues within the new erase block 312 until erase block 312 is either filled or the write operation completes (because no payload data remains to be written).

Continuing, if all payload data has been written, index information for the current erase block 312 is written to index page 314 (step 612). All necessary recordkeeping tasks are then performed (step 614). For example, the current erase block 312 and page offset information is written to L2P[LP]. The current page offset is incremented to advance the target page 314 to the next page 314.

However, it is possible that at any point, a write operation may fail to record payload data. In an exemplary embodiment, this condition is indicated by an error status flag from flash chip 310 that is read by media-buffer machine 204. If this error status flag is found to be true, the remainder of the write operation is abandoned, and an error is reported to host computer 108. The error reported to host computer 108 may be in accordance with the ATA or SCSI standard, or in any other suitable manner. The target erase block 312 is then marked as bad and may not be selected as a target in future write operations. Alternatively, if all requested payload data has been written, the write operation completes (step 616) and a no-error status is reported to host computer 108.

Figure 8:
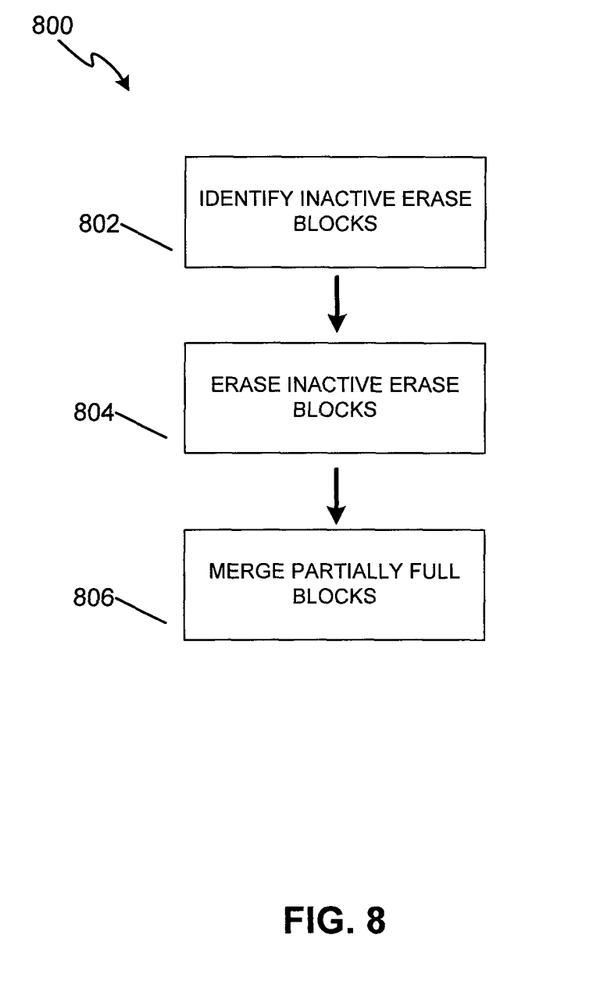
FIG. 8 illustrates, in block diagram format, an exemplary garbage collection method in accordance with an exemplary embodiment of the invention.

Further, in an exemplary embodiment, after a no-error status has been reported to host computer 108, garbage collection method 800 may be invoked. Garbage collection method may or may not take action to consolidate partially full erase blocks 312. Performing garbage collection after a write operation allows the write operation to complete in a reduced amount of time, resulting in a high apparent payload data transfer rate. In an exemplary embodiment, if an additional write request is received from host computer 108 shortly after completion of an earlier write request, and shortly after garbage collection method 800 has begun to consolidate one or more partially full erase blocks 312, fulfillment of the second write request may be postponed slightly in order to complete or pause garbage collection method 800.

By writing payload data in the order it was received and in a sequential fashion as described in sequential writing method 600, a flash memory management system can achieve significantly improved performance.

Figure 7A:
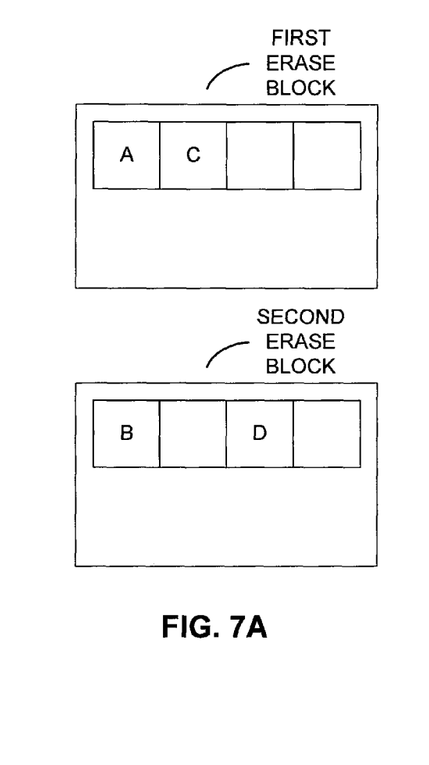
FIG. 7 illustrates storage of payload data in the order it was received in accordance with an exemplary embodiment of the invention.
Figure 7B:
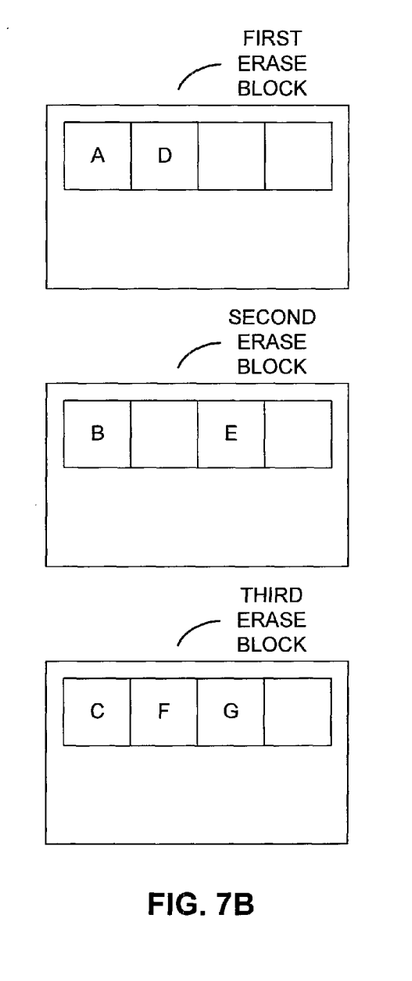
Figure 7C:
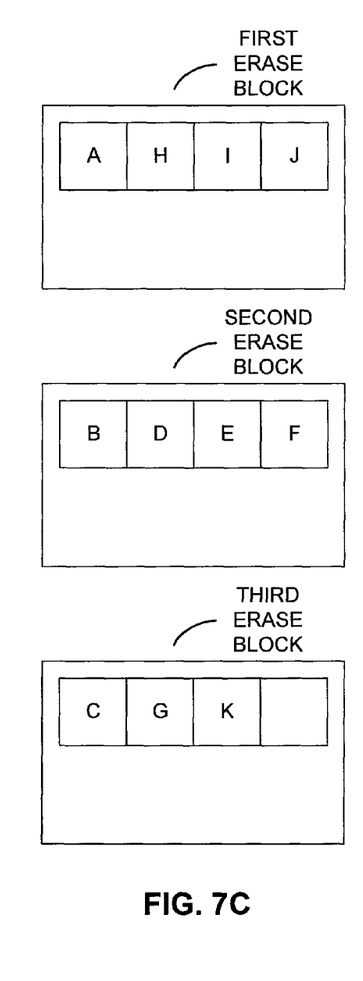

With reference now to FIGS. 7A-7C, in accordance with another exemplary embodiment, payload data is written in the order in which it was received in a sequential manner across multiple flash chips 106 in flash chip array 110. For example, with reference to FIG. 7A, a page of incoming payload data ("payload portion A") may be written to a page 314 ("target page A") in an erase block 312 located on a first flash chip 106. The next page of incoming payload data ("payload portion B") may be written to a page 314 ("target page B") in an erase block 312 located on a second flash chip 106. The next page of incoming payload data ("payload portion C") may be written to a page 314 ("target page C") in the erase block 312 on a first flash chip 106 to which payload portion A was previously written. Target page C may be the next sequential page 314 following target page A in erase block 312 on first flash chip 106. Target page C may also be a page 314 following target page A in erase block 312 on first flash chip 106, but not directly sequential to target page A. The next page of incoming payload data ("payload portion D") may be written to a page 314 ("target page D") in an erase block 312 located on second flash chip 106. Target page D may be located after target page B, as previously illustrated with target pages A and C. Thus, incoming payload data, as represented by payload portions A, B, C, and D, is written in the order in which it was received from a host, and pages within each erase block 312 are written in a sequential manner.

With continued reference to FIG. 7B, and in accordance with an exemplary embodiment, incoming payload data as represented by payload portions A-G is received from a host. Incoming payload data is written in the order in which it was received from the host. Payload portion A is written to a page 314 in a first erase block 312, payload portion B is written to a page 314 in a second erase block 312, and payload portion C is written to a page 314 in a third erase block 312. Continuing, payload portions D, E, F, and G are written as illustrated in FIG. 7B. Thus, first, second, and third erase blocks 312 may be located on the same flash chip 106. Alternatively, first, second, and third erase blocks 312 may be located on different flash chips 106. Again, incoming payload data has been written in the order in which it was received from a host, and pages within each erase block 312 have been written in a sequential manner.

Turning now to FIG. 7C, in accordance with an exemplary embodiment, incoming payload data as represented by payload portions A-K is received from a host. Payload portion A is written before payload portion B, payload portion B is written before payload portion C, and so on. Payload portions A-K are written in a manner which distributes them across a first, second, and third erase block 312, and in a sequential manner within any particular erase block 312. Incoming payload data is thus written in the order in which it was received from a host, and pages within each erase block 312 have been written in a sequential manner.

In accordance with the foregoing exemplary embodiments, the time order of the incoming payload data is preserved because pages of payload data were written in the order in which they were received. Further, within any particular erase block 312, payload data written to a first page 314 was received prior to payload data written to any subsequent pages 314. Thus, the incoming payload data was written in a time ordered manner. Further, the incoming payload data was written in a sequential manner within any particular erase block 312.

Any suitable number of erase blocks 312 located on one or more flash chips 106 may be selected to write incoming payload data. The number, location, and/or other characteristics of erase blocks 312 selected to write incoming payload data may be chosen based on considerations such as sustained write speed, burst write speed, degree of fragmentation, number of available erase blocks, and/or the like.

As successive read and write operations are performed on a flash memory device, erase blocks may become partially filled with valid data and/or partially filled with invalid or outdated data. In order to achieve more efficient storage on a flash memory device or in pursuit of other benefits, garbage collection algorithms may be employed in order to merge partially filled erase blocks, empty erase blocks containing only invalid and/or outdated data, and other flash memory maintenance tasks.

Turning now to FIG. 8, in an exemplary embodiment, a garbage collection method 800 comprises identifying inactive blocks, erasing inactive blocks, and merging partially full blocks. Garbage collection method 800 may operate in the background. Alternatively, garbage collection method 800 may be run at any time in order to achieve more efficient storage or free up additional space in flash memory array 110, or to achieve any other desired outcome.

In an exemplary embodiment, inactive erase blocks 312 are identified by a review of an erase list (step 802). If an erase block 312 currently has zero pages of active payload data, the erase block may be erased. Control signals are sent by flash controller 104 to flash chip 106 to erase the targeted erase block 312 (step 804). Once erased, the state of this erase block 312 should be updated from dirty to erased in PEB table 406.

Continuing with this exemplary embodiment, partially full erase blocks 312 can be merged (step 806). An erase block 312 which is not completely empty may be merged with other erase blocks. In particular, if a particular erase block 312 contains a low but nonzero number of pages holding valid payload data (i.e. if a particular erase block 312 holds only a small amount of payload data), payload data from that erase block can be written into current erase block 312. Data tables 408 and other indicia may then be updated as during a standard write operation. Once all payload data has been copied from a partially full erase block to current erase block 312, the partially full erase block may be marked as empty and/or erased.

In an exemplary embodiment, garbage collection method 800 involves copying valid payload data from one or more erase blocks into a single erase block 312. The technique used for selecting the target erase block 312 implements a wear leveling strategy for solid state drive 102, and is discussed below. During the copy operation, it is necessary to determine the logical page that data represents. Consulting data tables 408 to achieve this goal is time-consuming because, on average, both PEB table 406 and L2P table 404 would need to be examined in order to determine the logical page which addresses the physical source of the payload data. Thus, in an exemplary embodiment, the logical page number is recorded in the metadata of the page and is retrieved along with the payload data. The payload data is copied to a region of data buffer 206 configured for this operation. One or more pages may be read out at a single burst. The payload data is then written to the new target page(s), with the corresponding logical page number inserted into the metadata. Such an approach is similar to write method 600, except for 1) how the logical page number is obtained, and 2) when a write results in an error, the target erase block is marked bad without informing host computer 108.

In an exemplary embodiment, garbage collection operations to merge partially full erase blocks are divided into small chunks. Garbage collection method 800 may be interrupted by requests from host computer 108 to store additional payload data. In this event, incoming payload data is stored as described earlier and garbage collection method 800 may then resume operation.

Prior solid state drives generally did not implement garbage collection techniques. In these prior drives, since each new data page is always grouped with its immediate neighbors sharing the same erase block, prior systems would copy some of the neighboring data pages (specifically, those pages that precede the new page in the erase block), to a blank erase block and insert the new data page at the appropriate place. This leaves two erase blocks with partial data sets and, if the next write operation advantageously delivers the sequentially next page, it is added to the new erase block. On the other hand, if the next write operation delivers data from some other erase block, that host data transfer is postponed while the remainder of the original erase block is copied into the remainder of the open erase block. In this way the entire collection of pages in a single erase block is kept as a unit, and obsolete pages are never left stranded. It is clear that a worst-case situation will occur if the first page of one erase block is written, and immediately afterward the host writes to the first page of a different erase block, since the remainder of the first erase block must endure the time consuming copy operation. If this pattern is repeated then for each new host request, a new erase block must be obtained, and all those pages must be copied at each iteration.

In accordance with an aspect of the present invention, flash memory management using sequential write techniques may be combined with wear leveling concepts. In an exemplary embodiment, wear leveling may be accomplished via a circular writing approach, as disclosed in co-pending U.S. patent application Ser. No. 12/103,277 filed on Apr. 15, 2008, now U.S. Patent Application Publication No. 2009/0259801 entitled "Circular Wear Leveling", the contents of which are hereby incorporated by reference in their entirety. In another exemplary embodiment, wear leveling may be accomplished via traditional dynamic and/or static wear leveling techniques.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for flash memory management, comprising:
receiving payload data from a host;
writing the payload data in the order it was received to an erase block in a flash memory device; and
providing a logical to physical (L2P) table and a physical erase block (PEB) table configured to locate the payload data written to the flash memory device, wherein the L2P table and the PEB table are contained entirely in a random access memory;
wherein writing the payload data includes:
locating a target page in the erase block,
combining the payload data with metadata,
writing the payload data and the metadata to the target page in the erase block,
updating the L2P table,
updating the PEB table, and
responsive to page offset information indicating all pages in the erase block except an index page are full, writing index information for the erase block to the index page in the erase block.

2. The method of claim 1, wherein writing the payload data in the order it was received includes writing the payload data in a sequential manner within the erase block.

3. The method of claim 1, wherein the erase block includes an index page that stores erase block index information for the payload data written to the erase block.

4. The method of claim 3, further comprising using the index page to construct at least one of the L2P table and the PEB table when the flash memory device is powered on.

5. The method of claim 3, wherein the index page is the last physical page in the erase block.

6. The method of claim 1, wherein the PEB table includes information that maps consecutive pages of the payload data to different flash chips.

7. The method of claim 1, wherein the PEB table includes a bitfield indicating if a page is obsolete.

8. The method of claim 1, wherein the PEB table is configured to prevent at least one erase block from being used.

9. The method of claim 1, wherein the writing the payload data in the order it was received includes:

writing a first page of the payload data received from the host to a first erase block in the flash memory device;

writing a second page of the payload data received from the host to a second erase block in the flash memory device; and writing a third page of the payload data received from the host to the first erase block in the flash memory device;

wherein the first page of the payload data, the second page of the payload data, and the third page of the payload data are received in sequential order from the host, and wherein the third page of the payload data is written to the first erase block in a location following the first page of the payload data.

10. A method for data management on a flash memory device, comprising:

providing payload data to a flash memory device;

writing the payload data to an erase block on the flash memory device in the order it was received; and mapping a location of the payload data on the flash memory device, wherein the mapping includes providing a logical to physical (L2P) table and a physical erase block (PEB) table contained entirely in a random access memory, and wherein the L2P table and the PEB table are configured to locate the payload data written to the flash memory device;

wherein writing the payload data includes:
locating a target page in the erase block,
combining the payload data with metadata,
writing the payload data and the metadata to the target page in the erase block,
updating the L2P table,
updating the PEB table, and
responsive to page offset information indicating all pages in the erase block except an index page are full, writing index information for the erase block to the index page in the erase block.

11. The method of claim 10, wherein the erase block containing the payload data includes an index page that stores erase block index information for the payload data written to pages in the erase block.

12. The method of claim 10, wherein the erase block containing the payload data includes an index page that stores erase block index information for the payload data written to pages in a different erase block.

13. The method of claim 10, wherein all data structures needed to locate the payload data written to the flash memory device are located in their entirety in the random access memory.

14. A solid state drive, comprising:
a flash controller configured to communicate with a host;
a random access memory containing a logical to physical (L2P) table and a physical erase block (PEB) table, wherein the L2P table and the PEB table are configured to locate payload data written to the solid state drive, and wherein the L2P table and the PEB table are contained entirely in the random access memory; and
at least one flash chip configured to receive the payload data from the flash controller,
wherein the flash controller is configured to write the payload data to the at least one flash chip in a manner which preserves time order of the payload data including:
locating a target page in the erase block,
combining the payload data with metadata,
writing the payload data and the metadata erase block,
updating the L2P table,
updating the PEB table, and
responsive to page offset information indicating all pages in the erase block except an index page are full, writing index information for the erase block to the index page in the erase block.

15. The solid state drive of claim 14, wherein the flash controller includes a buffer-host machine, a media-buffer machine, a data buffer, a local buffer, and a sequence and control machine.

16. The solid state drive of claim 14, wherein the flash controller is configured to write the payload data in a sequential manner within an erase block.

17. A data storage system, comprising:
a memory configured for block-based erase operations;
a controller coupled to the memory, wherein the controller is configured to write incoming payload data to the memory in the order the payload data is received; and
a random access memory containing a logical to physical (L2P) table and a physical erase block (PEB) table, wherein the L2P table and the PEB table are configured to locate the payload data written to the data storage system, and wherein the L2P table and the PEB table are contained entirely in the random access memory;
wherein the controller is for:
locating a target page in the erase block,
combining the payload data with metadata,
writing the payload data and the metadata to the target page in the erase block,
updating the L2P table,
updating the PEB table, and
responsive to page offset information indicating all pages in the erase block except an index page are full, writing index information for the erase block to the index page in the erase block.

18. The data storage system of claim 17, wherein the controller includes a buffer-host machine, a media-buffer machine, a data buffer, a local buffer, and a sequence and control machine.

19. The data storage system of claim 17, wherein the controller is configured to write the incoming payload data in a sequential manner within an erase block.

20. The data storage system of claim 17, wherein the PEB table tracks pages within erase blocks of the memory such that when a particular page is deemed unusable for storing the payload data, other pages within the same erase block of the memory may still be used for storing the payload data.

* * * * *